United States Patent [19]
Arditi et al.

[11] Patent Number: 5,266,873
[45] Date of Patent: Nov. 30, 1993

[54] AUTOMATICALLY CONTROLLED CLEANING DEVICE, NOTABLY FOR A MOTOR VEHICLE WINDSCREEN

[75] Inventors: Marcel Arditi, Genéve, Switzerland; Louis Bécet, Sciez, France; Benjamin Ittah, Genéve, Switzerland

[73] Assignee: Dynamad SA, Geneva, Switzerland

[21] Appl. No.: 880,019

[22] Filed: May 8, 1992

[30] Foreign Application Priority Data

May 10, 1991 [FR] France .................. 91 05784

[51] Int. Cl.⁵ .................. B60S 1/08; G01N 29/00
[52] U.S. Cl. .................. 318/483; 318/460; 318/DIG. 2
[58] Field of Search ......... 318/443, 444, 483, DIG. 2, 318/128, 460, 643; 15/250 R, 250.12, 250.17; 73/24.01, 24.04, 29.01, 73; 310/311, 313 R, 313 A, 320, 322, 334

[56] References Cited

U.S. PATENT DOCUMENTS

| | | |
|---|---|---|
| 3,794,866 | 2/1974 | McElroy et al. |
| 4,180,886 | 1/1980 | Scherz .................. 134/184 X |
| 4,542,325 | 9/1985 | Kobayashi et al. .................. 318/483 |
| 4,768,256 | 9/1988 | Motoda .................. 15/250 R |
| 4,827,198 | 5/1989 | Mueller et al. |

FOREIGN PATENT DOCUMENTS

| | | |
|---|---|---|
| 0102622 | 11/1989 | European Pat. Off. |
| 2630470 | 1/1978 | Fed. Rep. of Germany |
| 59-029539 | 2/1984 | Japan |
| 59-192651 | 11/1984 | Japan |
| 833463 | 6/1981 | U.S.S.R. |

OTHER PUBLICATIONS

Article entitled "Acoustic Properties of Particle/Polymer Composites for Ultrasonic Transducer Backing Applications" Grewe, et al., Nov. 1990, pp. 506-513.

Article entitled "Multipurpose Backing Materials for Piezoelectric Broadband Transducers" Bar-Cohen, et al., May 1984, vol. 75, No. 5, pp. 1629-1633.

Primary Examiner—Bentsu Ro
Attorney, Agent, or Firm—Pollock, Vande Sande & Priddy

[57] ABSTRACT

An automatically controlled cleaning device is adapted to remove foreign bodies such as water from the surface of a window, such as a car window, which has an inside surface and an outside surface. This device has cleaning element which define at least one predetermined area on the outside surface of this window, driving circuit for the cleaning element which operate in response to a control signal, detection element capable of supplying a detection signal representative of the presence of foreign bodies on the outside surface of the window and control device capable of supplying a control signal in response to the detection signal wherein the detection element comprise a transducer able to emit at least one incident ultrasonic signal propagating within the thickness of the window and able to receive a reflected ultrasonic signal representative of the presence of the foreign bodies to analyse the detection signal and where the transducer is fixed by a first face against the inside surface of the window.

20 Claims, 3 Drawing Sheets

AUTOMATICALLY CONTROLLED CLEANING DEVICE, NOTABLY FOR A MOTOR VEHICLE WINDSCREEN

FIELD OF THE INVENTION

The invention relates to an automatically controlled cleaning device and, more particularly, to a windscreen wiper device, notably for motor vehicles, associated with ultrasonic means for detecting foreign bodies such as water on the outside surface of a windscreen, these means being adapted to supply a signal representative of the presence of said foreign bodies in order to effect appropriate control of said windscreen wiper device.

Over the last few years, various types of automatically controlled cleaning devices, such as windscreen wiper devices have been proposed.

DESCRIPTION OF THE PRIOR ART

A first device, functioning in response to vibrations produced by the impact of drops of rain on a detector arranged on the outside on the hood of the vehicle is described in European patent specification EP 0 102 622. According to this device, the detector is caused to vibrate in response to the impact of the drops of rain and thereby produces an output signal representative of the rain conditions, which is compared to a threshold, to supply a control signal for the windscreen wipers as soon as the output signal exceeds the threshold level.

Nonetheless, a device of this kind is not entirely satisfactory. The fact that the detector is arranged on the hood of the vehicle exposes it to a large number of contaminants, such as dust and the like which, mixed with the rain, cause disturbances in the mode of vibration of the detector and consequently cause the device to operate unreliably. In addition, every motor vehicle has various sources of vibrations, mainly coming from the engine and from contact between the vehicle and the road, which are capable of substantially altering the output signal representative of the rain conditions and, in this case too, prevent correct functioning of the windscreen wiper control. Moreover, when the drops of rain reach the detector when the vehicle is at rest or moving very slowly, the impact of the drops on the detector can be insufficient to produce a useful detection signal. Finally, since this device is not mounted in the area of the windscreen wipers, it does not make it possible to give a reliable picture of the state of cleanliness of the windscreen in the driver's field of vision.

German patent specification DE-A-2 630 470 discloses an automatic control device for controlling the speed of windscreen wipers as a function of the rain conditions which operates on the basis of the capacitive detection of moisture on the outside surface of the windscreen. However, a disadvantage of a device of this type is that it has relatively long reaction times. In addition, the fact that it is installed outside the vehicle makes it necessary to have the contacts projecting to the exterior which is difficult in this part of the vehicle.

A windscreen wiper device which does not have this latter disadvantage because its detection system is installed inside the vehicle and which operates on the basis of ultrasonic detection of the precipitation conditions is described in Soviet patent SU 833 463.

This detection system, installed on the inside surface of the windscreen of a motor vehicle comprises a first unit which emits ultrasonic waves and a second unit which receives and processes the ultrasonic signals emitted. The emitter unit is arranged on an outside edge of the windscreen whereas the receiving unit is arranged on an extreme opposite edge thereof. During operation, the ultrasonic signals emitted by the first unit are transmitted in the windscreen, detected by the second unit and converted by this latter into an electrical signal representative of the presence or absence of a film of water on the surface of the windscreen. Whether or not it is appropriate to switch on the windscreen wipers is determined by comparing the signal received with a reference signal.

However, in practice a device of this kind displays a number of disadvantages.

A main disadvantage of this device resides in the fact that this device is sensitive to different phenomena apart from the simple presence of a film of water on the outside surface of the windscreen. Indeed, it is, for example, difficult or even impossible to distinguish between the presence of a layer of condensation on the inside surface of the windscreen, in which case there is no point in operating the windscreen wipers, and the presence of a layer of the same type on the outside surface of the windscreen, in which case it is particularly appropriate to operate the windscreen wipers. This impossibility is due to a great resemblance between the ultrasonic signals which propagate in the windscreen by successive reflection between the inside and outside surfaces of the windscreen. Moreover, impact on the windscreen or an absorbing element, such as a hand, placed on the windscreen is capable of substantially changing the signals emitted, with the result that in the absence of a processing circuit for the complex signal, the device cannot reliably distinguish the nature of the origin of the changes in these signals and, in practice, often causes the windscreen wipers to operate when this is not required.

Another disadvantage resides in the fact that, with a device of this kind, it is difficult to distinguish whether it is appropriate to operate the windscreen wipers in the relatively frequent case where the area swept by the windscreen wipers is "dry" and the unswept area is still "wet". A situation of this type arises, for example, when, after a rainfall, a vehicle travelling in one direction crosses a vehicle travelling in the opposite direction and they splash each other.

In a device of this kind, the processing circuit of which is, for example, sufficiently sensitive to detect a fine drizzle (an example of one of the most interesting applications of a device of this kind), the presence of water in the unswept area of the windscreen will induce modification of the signals emitted and operate the windscreen wipers on an already dry area of the windscreen. Operation of this kind therefore causes premature wear of the windscreen wiper blades and consequently their frequent replacement.

OBJECTS OF THE INVENTION

It is therefore a main object of the invention to overcome the disadvantages of the above mentioned prior art by supplying an automatically controlled cleaning device, notably for a motor vehicle, that is simple and cheap, which operates reliably regardless of the nature of the foreign bodies to be removed and which does not need a complicated signal processing circuit.

BRIEF SUMMARY OF THE INVENTION

It is therefore an object of the invention to supply an automatically controlled cleaning device designed to remove foreign bodies such as water on the surface of a window, the latter having an inside surface and an outside surface, this device comprising cleaning means which define at least one predetermined area on the outside surface of this window, driving means for the cleaning means, detection means capable of supplying a detection signal representative of the presence of foreign bodies on the outside surface of the window and control means capable of supplying a control signal to the driving means in response to the detection signal.

In accordance with the invention the detection means comprise a transducer able to transmit at least one incident ultrasonic signal propagating within the thickness of the window and able to receive a reflected ultrasonic signal representative of the presence of said foreign bodies to provide said detection signal, the transducer being fixed by a first face against the inside surface of the window.

As a result of these characteristics, the ultrasonic signals emitted by the transducer propagate within the thickness of the window and are reflected locally on a surface equivalent to that of the transducer so that the influence of extraneous phenomena, such as those mentioned in connection with the description of the prior art and in particular of Soviet patent SU 833 463, is considerably diminished and that the presence of foreign bodies on the outside surface of the window is reliably determined.

Moreover, when the device of the invention is applied to a motor vehicle windscreen, it can easily be placed in a neutral area thereof without reducing the driver's field of vision because it only comprises a single element in contact with the windscreen.

According to a preferred embodiment of the invention the transducer is arranged in the cleaned area of the window.

BRIEF DESCRIPTION OF THE DRAWINGS

Other characteristics and advantages of the invention will emerge from the following description of non-limiting embodiments given by way of example with reference to the accompanying drawings in which.

DETAILED DESCRIPTION OF THE INVENTION

The following detailed description of the automatically controlled cleaning device of the invention will be given in the context of an application to control the windscreen wipers of a motor vehicle. This device is of course not limited to this application and many other applications could be envisaged by the person skilled in the art. For example, this invention could also be advantageously used in the nautical field. It is also clear that the cleaning device is not limited to the control of the windscreen wipers and that other systems could be envisaged by the person skilled in the art. In the field of motor vehicles, mention may also be made for example of the control of cleaning devices comprising heating means such as resistances.

Figure 1:
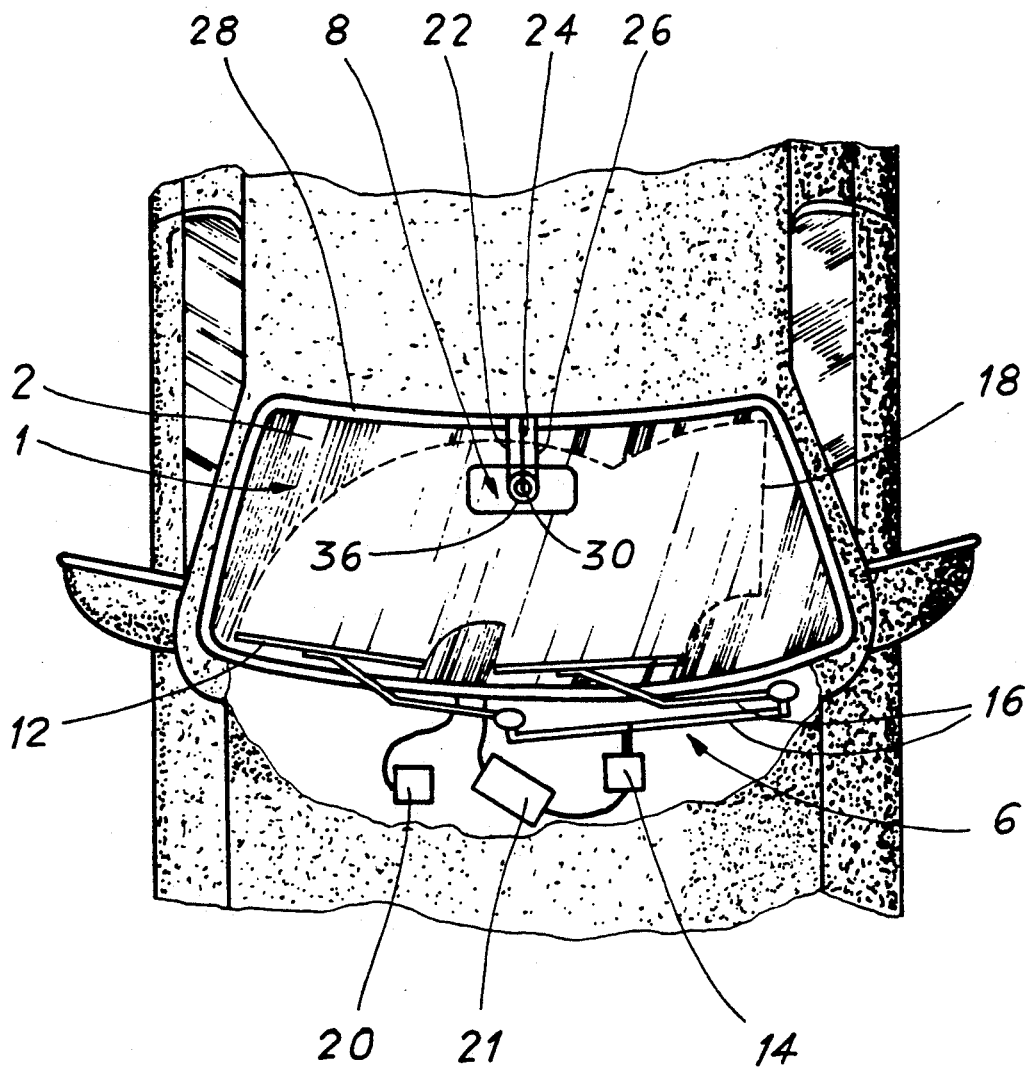
FIG. 1 is a partially diagrammatic view from above of a motor vehicle provided with a cleaning device of the invention.
Figure 2:
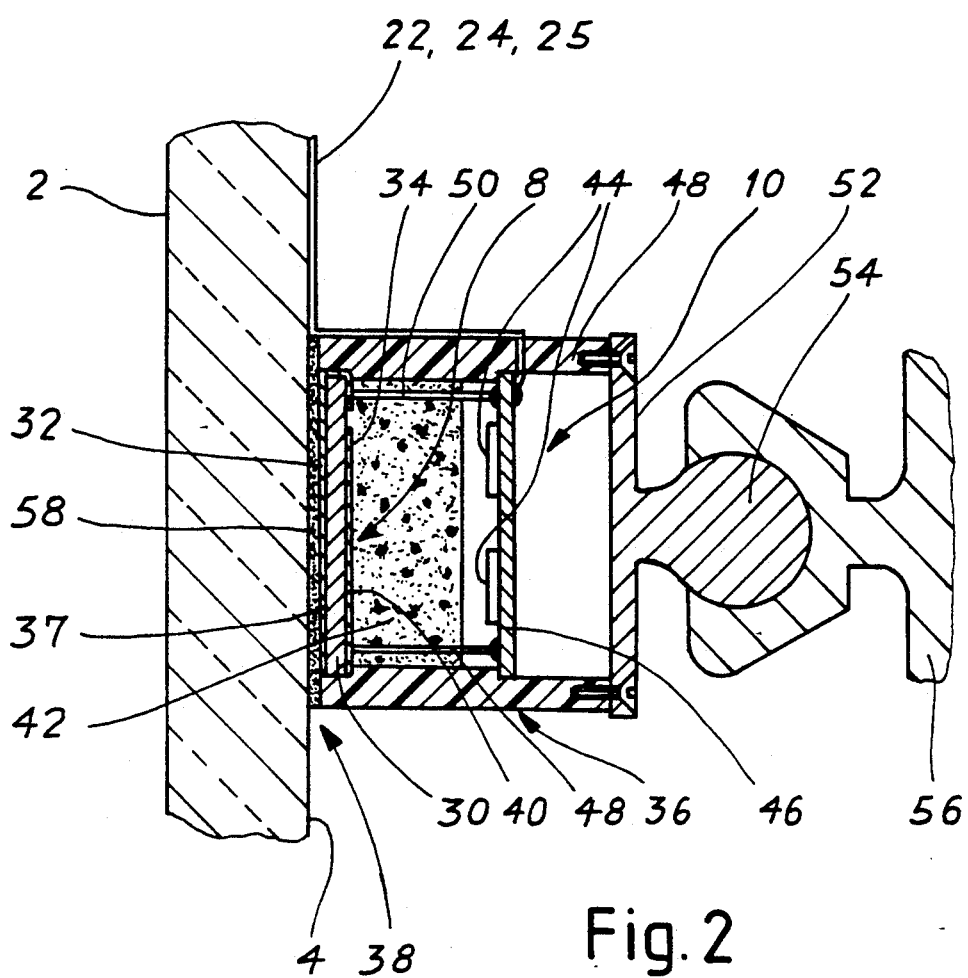
FIG. 2 is a partial section of the detection assembly of the cleaning device of the invention.

Referring initially to FIG. 1, this shows a partial view from above of a motor vehicle fitted with the automatically controlled cleaning device of the invention. The motor vehicle comprises in conventional manner a window 1 forming a windscreen and which comprises an outside surface 2 and an inside surface 4 (FIG. 2).

It will be noted that the windscreen shown is made of a single layer, while a device of this kind may of course also be adapted to laminated windscreens.

This windscreen 1 is also associated with a cleaning device designed to remove the presence of foreign bodies that could be deposited on the outside surface 2 of the windscreen. In the example described, the term "foreign bodies" is applied to any element such as water, snow, mud, etc. located on the outside surface 2 and able to enter the driver's field of vision.

Figure 3:
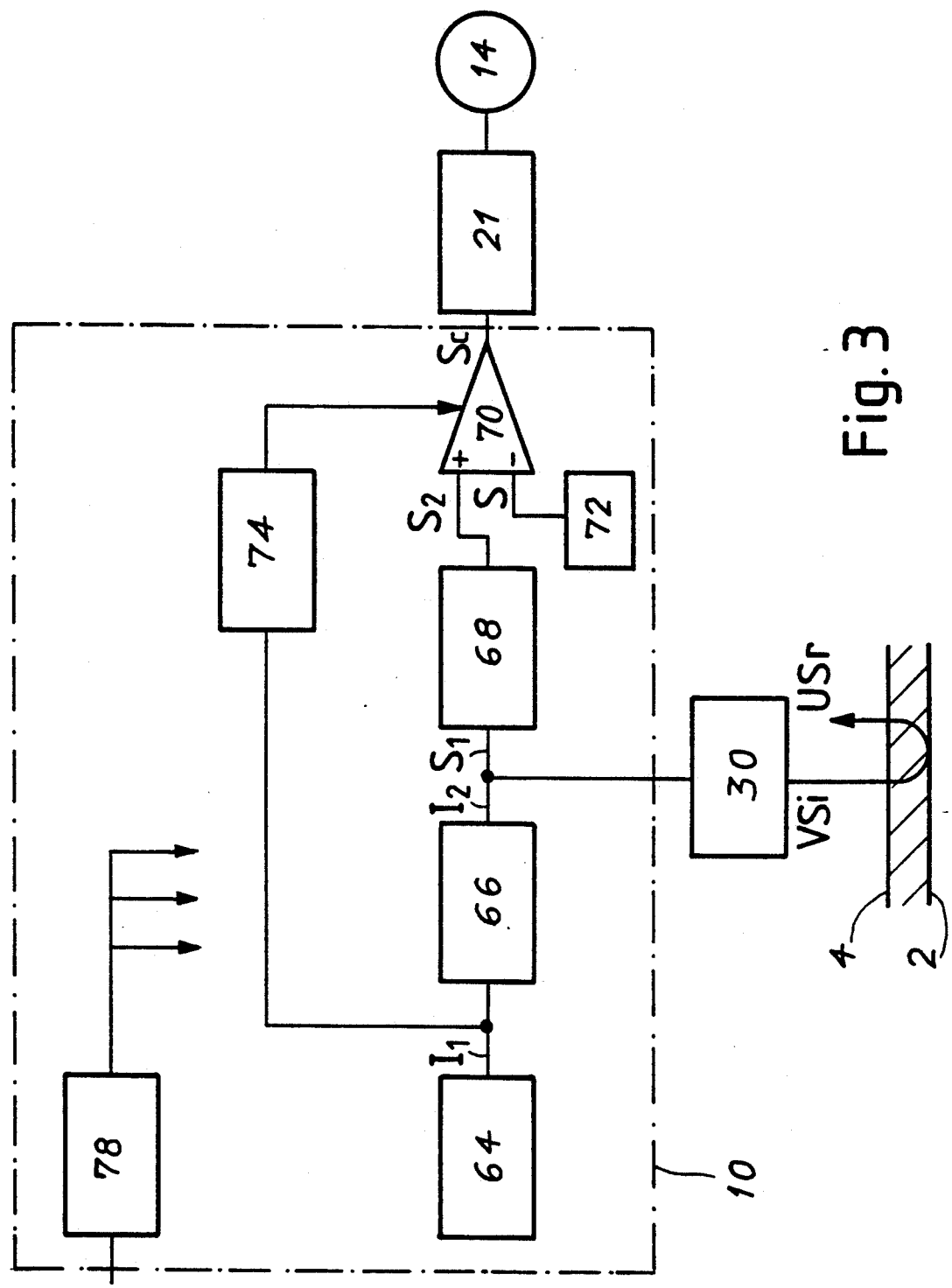
FIG. 3 is a block diagram showing the connections between various elements of the cleaning device of the invention.

This cleaning device substantially consists of a windscreen wiper assembly 6, means 8 for detecting said foreign bodies and an electronic control and processing circuit 10 (FIG. 3).

The windscreen wiper assembly comprises two blades 12 driven by a motor 14 by means of a rod assembly 16. The blades 12 are capable of travelling over the outside surface 2 of the windscreen in an alternate arc-like movement, thereby defining a predetermined area 18 delimited by the broken lines and representing the minimum field of vision which the driver needs to have available to him. This arrangement will not be described further since it is conventional and well known to the person skilled in the art.

The detection means 8 which will be described in greater detail in connection with FIG. 2 are designed to produce a detection signal representative of the presence of foreign bodies on the outside surface of the windscreen 2. According to the invention, these means 8 are fixed to the inside face 4 of the latter and are electrically connected to the circuit 10, which is, in turn, connected on the one hand to the power supply means 20 composed in the example described of the vehicle battery and, on the other hand, to the motor 4 via the intermediary of a control circuit 21 of the motor to start it up or to stop it in response to a detection signal coming from the means 8.

The circuit is of course also connected to earth, which may advantageously be composed of the vehicle body.

The three electrical connections which have just been described are respectively provided by the conductors 22, 24 and 26 bonded to the inside surface of the windscreen and extending from the detection means towards the elements in question, for example via the seal 28 which serves to fix the windscreen onto the body.

In another embodiment, these conductors can take the form of metal deposits made during manufacture of the windscreen.

Referring in particular to FIG. 2, the detection means 8 comprise according to the invention an ultrasonic transducer 30 capable of emitting an incident ultrasonic signal propagating within the thickness of the windscreen 1 and capable of receiving a reflected ultrasonic signal representative of the presence of said foreign bodies on the outside surface 2 of the windscreen 1 to provide a detection signal which is then transmitted to the control circuit and exploited by this latter in order in that case to start the motor 14.

In the example described, the transducer 30 is configured in the form of a disc which is made of a piezoelectric ceramic such as lead titanate. The two opposing faces of the disc are each covered by an electrode 32 and 34 respectively. These two electrodes 32, 34 can be made in known manner by depositing a thin layer of metal such as nickel or silver.

The transducer 30 is housed and fixed in a plastic housing 36 configured like the section of a tube in such a manner that a first face 37 of the transducer provided with its electrode is flush with or projects slightly beyond the outside surface of the housing 36 thereby sealing a first end 38 thereof.

In the embodiment shown in FIG. 2, the transducer 30 is associated by a second face 40 opposite the first one with damping means 42 also housed in the housing 36. These damping means make it possible to dampen the reflected waves in order to limit the disturbances of the detection signal and thereby to simplify processing of this signal by the electronic circuit the components of which will be described in detail hereafter in connection with FIG. 3. In this case, these damping means comprise metal particles embedded in an organic bonding material attenuating the ultrasound. The size of the metal particles is preferably 20 to 50 times smaller than the wavelength of the ultrasonic signals in order to disperse the wave and thereby achieve effective damping.

By way of example, tungsten particles having a size of about 5 micrometres embedded in a synthetic resin such as an epoxy resin have given a satisfactory result.

The damping means 42 used in the embodiment described are of course not essential to the working of the device of the invention and can be dispensed with in a simpler embodiment.

The plastic housing 36 also houses the electrical control and processing circuit 10 formed by electronic components 44 such as the integrated circuits, two of which are shown in the figure, mounted on a printed circuit 46.

The electronic control circuit 10 is connected on the one hand to the electrodes 32, 34 by conductors 48, 50 extending towards the inside of the housing 36 in the damping means 42 and, on the other hand, to the motor 14 via the intermediary of the control 21 and to the battery 20 by the conductors 22, 24 and 26 which extend through the wall 48 of the housing, only one of which is shown in FIG. 2.

The housing 36 is closed by a cover 52 fixed, for example, by means of a screw to the second extremity of this latter. This cover 52 has a ball joint 54 on which is advantageously fixed one extremity of a fixing arm 56 of a rear-view mirror.

As clearly shown in FIG. 2, the housing 36 is fixed by an adhesive to the inside surface 4 of the windscreen 1. This bonding is effected by means of a film of adhesive 58 extending between the surface of the transducer 30 and the inside surface of the windscreen.

This film of adhesive 58 has a very small thickness as compared to the wavelength of the ultrasonic signals transmitted by the transducer 30.

This procedure avoids, during the propagating of the signals in the windscreen, extraneous reflections at the bonded interface, with the inside surface of the windscreen of the waves emitted and excessive absorption of the signals, so as to ensure good coupling between the transducer and the inside surface of the windscreen.

For this purpose, with a wavelength of the signals emitted in the order of millimetres, a film about one hundredth of a millimetre thick gives satisfactory results.

To achieve efficient uniform transmission and reception of the ultrasonic signals respectively emitted and received by the transducer, care should be taken to ensure that no air bubbles are present at the interfaces transmitting the ultrasonic signals and especially between the transducer and the inside surface of the window.

It will also be noted that the adhesive used must have stable physical characteristics over a wide temperature range and, in the example described, which corresponds to the extreme conditions conventionally required in the motor industry, namely from $-40°$ to $+100°$ C. A synthetic adhesive of the epoxy type could advantageously be used.

It will also be noted that in the embodiment described, the detection means are advantageously arranged in the predetermined area 18 or in other words in the area swept by the blades of the windscreen wipers. An arrangement of this type notably makes it possible to give a true picture of the state of the windscreen after each passage of the blades of the windscreen wipers without, moreover, reducing the driver's field of vision because the detection means are, as mentioned above, associated with the base mounting the rear-view mirror onto the windscreen.

The block diagram of the electronic control circuit of the cleaning device of the invention will now be described with reference to FIG. 3.

The electronic control circuit 10 comprises on the one hand a clock circuit 64 which delivers impulses $I_1$ of a duration between 50 and 200 nanoseconds. On the other hand, the circuit 64 comprises a divider which makes it possible to define the frequency of repetition of these impulses $I_1$ in a range between 1 and 100 impulses per second.

These impulses $I_1$ are supplied to a shaping circuit 66 which is adapted to deliver impulses $I_2$ of an amplitude of 10 volts.

These impulses $I_2$ excite the detection means formed by the piezoelectric transducer 30 which, in response to these impulses $I_2$ creates incident ultrasonic waves $VS_i$, the frequency of which is between 1 and 10 MHz and the duration of which is less than 1 microsecond. These waves propagate within the thickness of the windscreen and, in fact, undergo a large number of reflections between the inside and outside faces of the windscreen. The reflected ultrasonic waves $US_r$ create an electrical signal $S_1$ in the transducer 30 which is representative of the presence or absence of a foreign body on the outside surface of the windscreen.

Each electrical signal $S_1$ thereby formed is supplied to an amplifier 68. The electrical signals produced are of the order of 5 millivolts. The amplifier 68 has an amplification factor of 40 decibels and a pass-band of 1 to 10 MHz. In other words, it transforms the signals $S_1$ generated by the transducer 30 from a value of 5 millivolts into signals $S_2$ of a value of 500 millivolts peak to peak.

In this connection it will be noted that this amplifier comprises an input circuit capable of withstanding without damage the voltage present at the output of the shaping circuit 66.

These signals $S_2$ are then supplied to the positive input of a comparator 70, the negative input of which is connected to means 72 defining a comparison threshold S. For these specific applications, these means may of course be adjustable. This comparator 70 is also connected to the output of the circuit 64 via the intermediary of a delay circuit 74. This circuit 74 makes it possible to effect the comparison in a time window. In other words, this window, of a duration less than 10 microseconds, is open with a delay adjustable between 2 and 50 microseconds after each impulse supplied to the shaping circuit 66. To achieve this delay, the circuit 74 counts the impulses of the watch of circuit 64 which follow the impulse delivered to the circuit 66. This delay of 2 to 30 microseconds is easily adjustable, for example by defining certain corrections in the circuit 10 so as to be able to adapt this delay to the characteristics of the window on which the detection means are installed.

At the output, the comparator 70 supplies a binary signal $S_c$ to a control circuit 21 which starts the motor M of the windscreen wipers for a determined time if the presence of a foreign body is detected on the surface of the windscreen.

It will also be noted that the control circuit can supply a control signal from one or several other devices such as the control signal for closing the hood. The assembly of this circuit 10 is supplied in this particular case by the battery of the vehicle via the intermediary of a stabilization circuit 78 supplying a stable voltage of 10 volts and operated permanently as soon as the vehicle's ignition is switched on.

The device of the invention as applied to a motor vehicle which has just been described operates in the following manner:

In response to electrical signals delivered by the electrical circuit 10 the transducer 30 regularly generates incident ultrasonic signals which propagate within the thickness of the windscreen 1 and reflect from the outside surface 2 of the windscreen. The intensity of the reflected ultrasonic signals is a function of the presence or absence of foreign bodies such as water on the outside surface of the windscreen. The reflected ultrasonic signals received by the transducer are then transformed into electrical signals by this latter and compared to a reference threshold by the comparator 70 at a predetermined instant. The result of the comparison then leads to the instruction to start or switch off the motor.

What is claimed is:

1. An automatically controlled cleaning device for removing foreign bodies from the surface of a window, the window having an inside surface and an outside surface, and said device comprising cleaning means which defines at least one cleaning area on the outside surface of the window, driving means for driving the cleaning means, detection means for supplying a detection signal representative of the presence of foreign bodies on the outside surface of the window, and control means for supplying a control signal to the driving means in response to the detection signal, wherein the detection means comprises a single transducer, means for causing said transducer to emit at least one incident ultrasonic signal propagating across the thickness of the window, and means for measuring and discriminating the amplitude of an ultrasonic signal reflected back to said single transducer to determine the presence of said foreign bodies on a portion of the outside surface of the window opposite to said single transducer and to provide the detection signal in response to said determination, and wherein said single transducer is fixed with a fist face against the inside surface of the window.

2. An automatically controlled cleaning device according to claim 1, wherein the transducer is arranged in the cleaning area of the window.

3. An automatically controlled cleaning device according to claim 2, wherein the transducer is associated by a second face, opposite the first face, with damping means.

4. An automatically controlled cleaning device according to claim 3, wherein the damping means comprises metal particles embedded in an organic bonding material.

5. An automatically controlled cleaning device according to claim 4, wherein the size of the particles is 20 to 50 times smaller than the wavelength of the ultrasonic signal.

6. An automatically controlled cleaning device according to claim 5, wherein the duration of the incident ultrasonic signal is less than 1 microsecond.

7. An automatically controlled cleaning device according to claim 6, wherein the reflected ultrasonic signals are measured for a period lasting less than 10 microseconds and with a delay of between 2 and 50 microseconds from the time of transmission of the incident ultrasonic signal.

8. An automatically controlled cleaning device according to claim 7, wherein the transducer is fixed to the window by means of an adhesive film.

9. An automatically controlled cleaning device according to claim 7, wherein the transducer and the damping means are housed in a housing presenting the configuration of the section of a tube.

10. An automatically controlled cleaning device according to claim 1, wherein the transducer is fixed to the window by means of an adhesive film.

11. An automatically controlled cleaning device according to claim 1, wherein the transducer is associated by a second face, opposite the first face, with damping means.

12. An automatically controlled cleaning device according to claim 11, wherein the damping means comprises metal particles embedded in an organic bonding material 13. An automatically controlled cleaning device according to claim 12, wherein the size of the particles is 20 to 50 times smaller than the wavelength of the ultrasonic signal.

14. An automatically controlled cleaning device according to claim 13, wherein the duration of the incident ultrasonic signal is less than 1 microsecond.

15. An automatically controlled cleaning device according to claim 14, wherein the reflected ultrasonic signals are measured for a period lasting less than 10 microseconds and with a delay of between 2 and 50 microseconds from the time of transmission of the incident ultrasonic signal.

16. An automatically controlled cleaning device according to claim 12, wherein the transducer and the damping means are housed in a housing presenting the configuration of the section of a tube.

17. An automatically controlled cleaning device according to claim 1, wherein the duration of the incident ultrasonic signal is less than 1 microsecond.

18. An automatically controlled cleaning device according to claim 17, wherein the reflected ultrasonic signals are measured for a period lasting less than 10 microseconds and with a delay of between 2 and 50 microseconds from the time of transmission of the incident ultrasonic signal.

19. An automatically controlled cleaning device according to claim 1, wherein the reflected ultrasonic signals are measured for a period lasting less than 10 microseconds and with a delay of between 2 and 50 microseconds from the time of transmission of the incident ultrasonic signal.

20. An automatically controlled cleaning device according to claim 1, wherein the window is a windscreen, on the inside surface of which a base of a rear-view mirror mounting is bonded, and wherein the transducer is housed in the base of the rear-view mirror mounting.

* * * * *